March 31, 1959 W. E. MARTIN 2,879,650
FLEXIBLE COUPLING
Filed Feb. 9, 1956 2 Sheets-Sheet 1
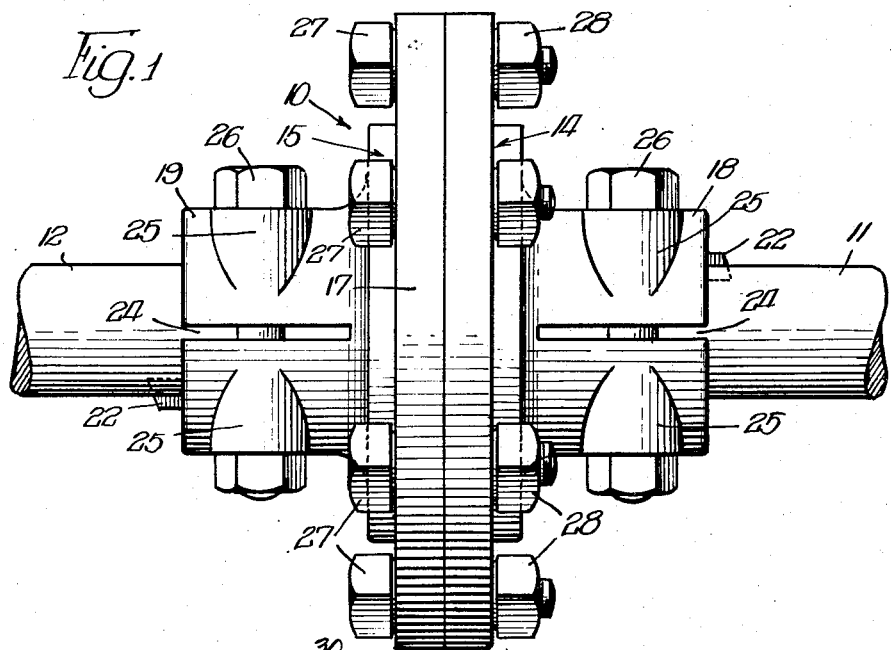
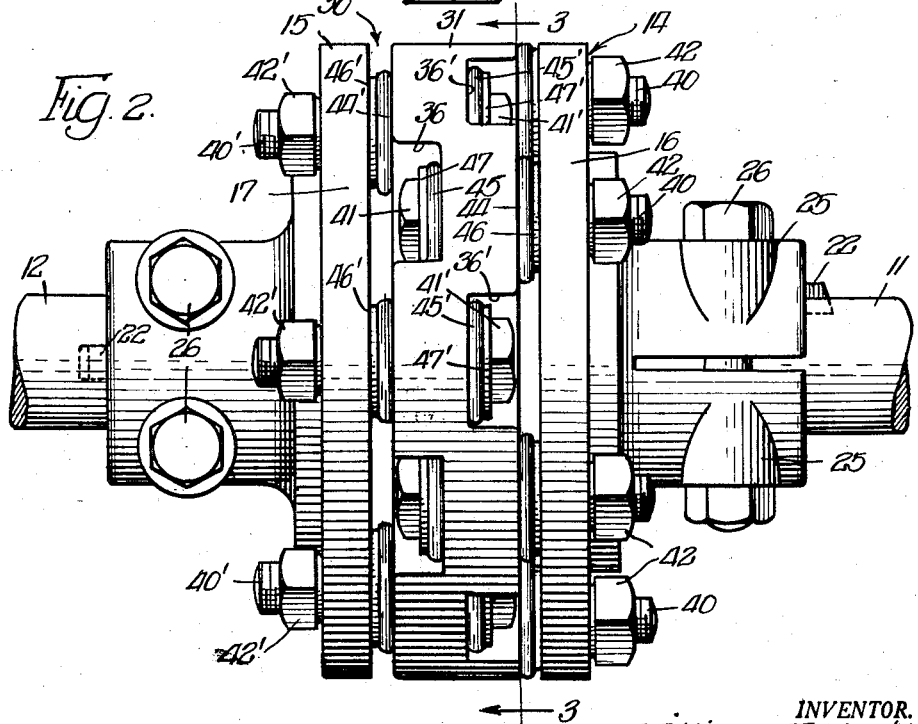
INVENTOR.
William E. Martin,
BY Brown, Jackson,
Boettcher & Dienner
Attys

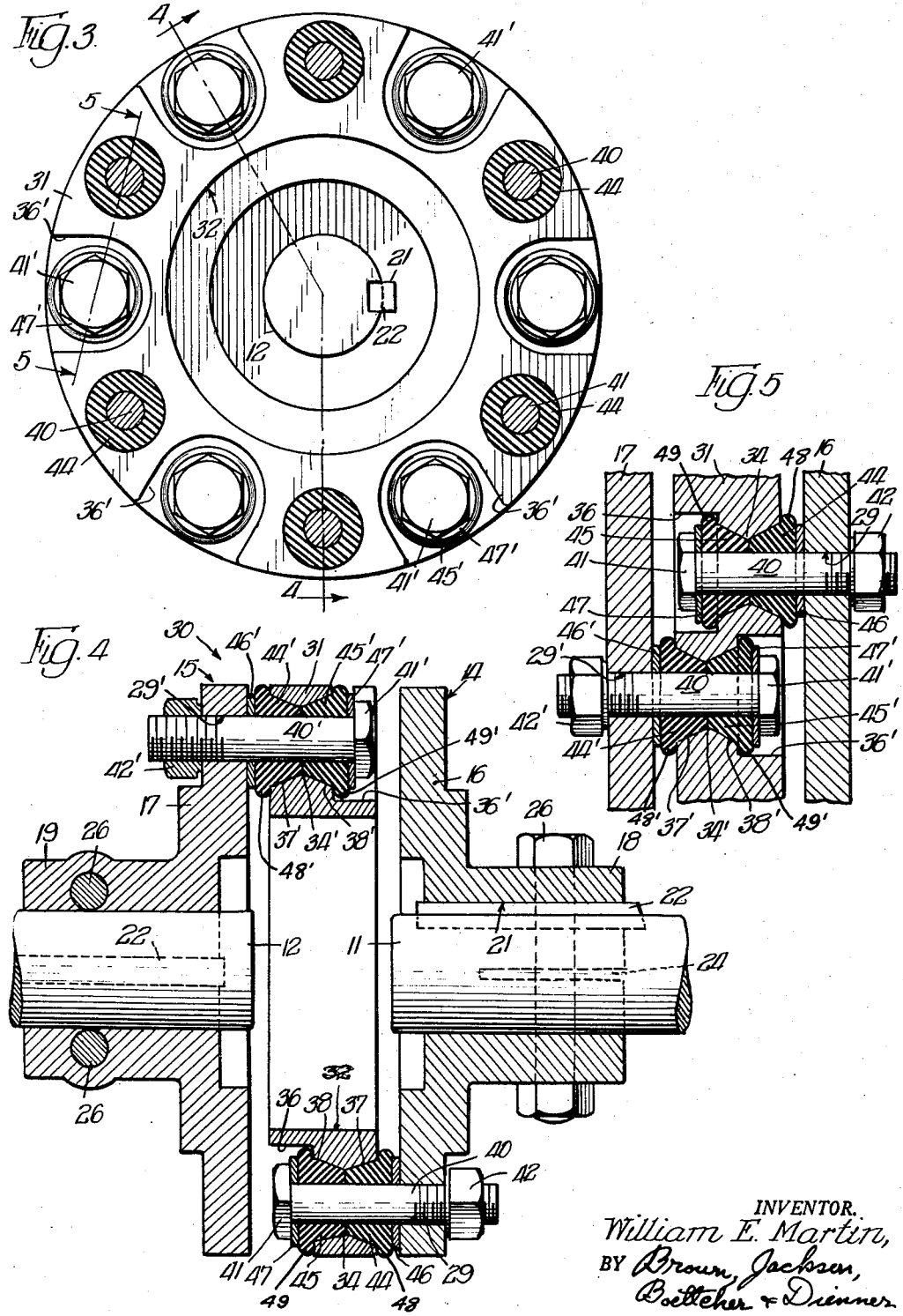
March 31, 1959 W. E. MARTIN 2,879,650
FLEXIBLE COUPLING
Filed Feb. 9, 1956 — 2 Sheets-Sheet 2
INVENTOR.
William E. Martin,
BY Brown, Jackson,
Boettcher & Dienner
Attys.

United States Patent Office 2,879,650
Patented Mar. 31, 1959

2,879,650

FLEXIBLE COUPLING

William E. Martin, Kewanee, Ill.

Application February 9, 1956, Serial No. 564,536

9 Claims. (Cl. 64—10)

The present invention relates to an improved flexible coupling for coupling two torque transmitting shafts together.

One of the objects of the invention is to provide improved flexible coupling parts for quickly and easily converting a conventional flange type of bolted rigid coupling into a flexible or resilient coupling. In many installations of power transmission shafting using the conventional bolted flange type of rigid shaft coupling, there frequently arises the need or desirability of substituting a flexible coupling for one of these rigid couplings. This may arise from not having the shafts properly aligned in the original installation, or because of the shafts getting out of alignment during use, or because of new load characteristics being imposed on the shafting requiring a resilient or flexible coupling.

My invention provides improved flexible coupling parts which enable the conventional flange type of rigid coupling to be quickly and easily converted into a flexible or resilient type of coupling. In effecting the conversion, all of the parts of the original flange coupling are utilized with the exception of the longitudinal coupling bolts. That is to say, these standard flange types of rigid shaft couplings comprise two coupling elements each in the form of a circular coupling flange having a shaft mounting hub projecting outwardly therefrom, and both of these coupling elements are utilized in the converted flexible coupling. The conversion is effected by interposing between these circular coupling flanges an intermediate coupling ring which is connected with the right hand coupling disk by a right hand set of rubber bushed coupling bolts, and which is connected with the left hand coupling flange by a left hand set of rubber bushed coupling bolts. The intermediate coupling ring is interposed between the original coupling flanges by cutting off the end of one shaft and separating the original coupling flanges by a distance sufficient to accommodate the intermediate coupling disk.

One of the improved features of my new intermediate coupling ring is the provision of two sets of pockets which are in alternately offset relation in the opposite faces of this intermediate coupling ring, one set of pockets receiving the inner ends of the right hand set of coupling bolts and the other set of pockets receiving the inner ends of the left hand set of coupling bolts. By having this alternately offset relation of pockets, the over-all length of the flexible coupling is substantially reduced. Also, by virtue of this alternately offset relation of pockets, the point of flexure between the intermediate coupling ring and the right hand set of coupling bolts is approximately in the same transverse plane as the point of flexure between the intermediate coupling ring and the left hand set of coupling bolts. These two points of flexure act in series in the coupling, thus accommodating substantial degrees of misalignment and of torsional flexure between the two shafts.

While the feature of being able to convert a conventional flange type of rigid coupling into a flexible coupling constitutes an important feature of my invention, nevertheless I wish it to be understood that the invention can also be embodied in entire unit form wherein all of the coupling parts are manufactured and sold as a completely assembled flexible coupling. This completely assembled flexible coupling will have the above described distinctive features of the alternately offset relation of the pockets in the intermediate coupling ring, and also the two points of flexure disposed in substantially the same transverse plane and acting in series.

Other objects, features and advantages of the invention will appear from the following detailed description of one preferred embodiment thereof. In the accompanying drawings illustrating such embodiment:

Figure 1 is a side elevational view of a conventional flange type of rigid coupling before its conversion into a flexible coupling;

Figure 2 is a side elevational view showing this conventional flange type of rigid coupling converted into a flexible coupling;

Figure 3 is a transverse sectional view through the converted flexible coupling taken on the plane of the line 3—3 of Figure 2;

Figure 4 is an offset axial sectional view taken on the plane of the line 4—4 of Figure 3; and Figure 5 is a fragmentary detail sectional view taken approximately on the plane of the line 5—5 of Figure 3.

In Figure 1 I have illustrated a conventional or standard flange type of rigid coupling 10 for connecting the ends of two power transmitting shafts 11 and 12. This rigid coupling comprises two identical coupling elements, designated for convenience as the right hand element 14 and the left hand element 15. These two elements comprise circular flanges 16 and 17 having hubs 18 and 19 extending therefrom for mounting on the shafts 11 and 12. The hubs 18 and 19 may be of the solid keyed type or of the clamping keyed type, the latter being shown. Such clamping keyed hubs have keyways 21 for receiving driving keys 22 engaging in keyways in the shafts, and these clamping hubs are longitudinally split in planes at right angles to the keyways, as shown at 24. The split hubs 18 and 19 are formed with bolt receiving bosses 25 for receiving the clamping bolts 26 passing at right angles to the split lines 24 for clamping the split hubs to the shafts 11 and 12 over the keys 22. The circular flanges 16 and 17 are rigidly connected together by bolts 27 passing through both flanges and having nuts 28 screwing over their ends. In medium and large size couplings, there are usually six of these bolts 27 passing through bolt holes 29—29' in the flanges 16 and 17. It will be obvious that the coupling 10 establishes a rigid unyielding connection between the shafts 11 and 12, and affords no misalignment correcting characteristic nor torque cushioning action.

In Figure 2 I have illustrated the rigid coupling 10 of Figure 1 converted into a flexible coupling, which I have designated 30. This flexible coupling comprises the original right and left hand coupling elements 14 and 15, with the through bolts 27 removed therefrom, and with these coupling elements 14 and 15 separated sufficiently to permit the interposition of an intermediate metallic coupling ring or annulus 31 therebetween. Because this intermediate coupling element 31 is a ring having a central aperture 32 of sufficient size to accommodate the ends of the shafts 11 and 12, the interposition of this coupling element between the standard flange coupling elements 14 and 15 may be readily effected without disturbing either of the shafts 11 or 12, if one or both of the coupling elements 14 or 15 can be slid outwardly along the shafts 11 or 12 a sufficient distance to accommodate the intermediate coupling ring 31. Alternatively, if either of the shafts 11 or 12 with its coupling element mounted thereon can be slid outwardly, this procedure would also permit the interposition of the intermediate coupling ring 31. Failing in either of these, it may be necessary to cut off the end of either shaft 11 or 12 a sufficient amount to permit the coupling elements 14 and 15 to be separated sufficiently for accommodating the coupling ring 31.

Such intermediate coupling ring 31 has a series of angularly spaced holes 34, 34' extending transversely therethrough, there being twice as many of these holes as there were bolts 27 in the original coupling 10. For example, the original coupling 10 shown in Figure 1 had six through bolts 27, from which it follows that the intermediate coupling ring 31 for this conventional coupling indicated at 10 will accordingly have twelve transverse holes 34, 34' all equally distributed. Six alternate transverse holes 34 have their left hand ends terminating in U-shaped pockets 36 formed in the left hand face of the coupling ring 31; and the other six transverse holes 34' lying between the alternate holes 34 have their right hand ends terminating in U-shaped pockets 36' formed in the right hand face of the coupling ring 31. Those ends of the holes 34, 34' which are opposite to the U-shaped pockets 36, 36' are formed with conical depressions 37, 37'. The inner ends of the U-shaped pockets 36, 36' are also formed with conical depressions 38, 38'. Preliminary to flexibly bolting the intermediate coupling ring to the right and left hand coupling elements 14 and 15, these latter coupling elements are rotated relatively to each other to place the bolt holes 29 of the right hand coupling element 14 intermediate the bolt holes 29' of the left hand coupling element 15.

Flexible coupling connection is established between the right hand coupling flange 16 and the coupling ring 31 by six bolts 40 passing through alternate sets of holes 29, 34 and having heads 41 at their inner ends and nuts 42 screwing over their outer ends. Mounted on the bolts 40 are outer conical rubber bushings 44 seating in the outer conical depressions 37, and also mounted on said bolts are inner conical rubber bushings 45 seating in the inner conical depressions 38. These outer and inner conical rubber bushings have their larger end faces backed up by washers 46 and 47. Flexible coupling connection is established between the left hand coupling flange 17 and the intermediate coupling ring 31 by a like arrangement of siz bolts 40' passing through alternate sets of apertures 29', 34', and having heads 41' at their inner ends and nuts 42' screwing over their outer ends. Mounted on each of these latter bolts 40' are outer conical rubber bushings 44' seating in the outer conical depressions 37', and inner conical rubber bushings 45' seating in the inner conical depressions 38', with washers 46' and 47' backing up the larger end faces of these rubber bushings. The outer clamping nuts 42, 42' are tightened up to place the sets of rubber bushings under compression within their respective conical depressions. The rubber bushings of both the inner and outer sets 44, 44' and 45, 45' are each preferably of greater length than the conical depressions 37, 37' and 38, 38'. Hence when these rubber bushings are thus drawn up under a relatively high degree of compression by the above described tightening of the nuts 42, 42', the unconfined large ends of both sets of bushings expand outwardly into the form of projecting annular beads, these beads being designated 48, 48' in the case of the outer bushings 44, 44' and being designated 49, 49' in the case of the inner bushings 45, 45'. Alternatively, the rubber bushings might have these projecting annular beads 48—49' preformed thereon prior to being placed under compression within the flexible coupling. In either event, these beaded outer ends 48, 48' of the outer rubber bushings 44, 44' and their washers 46, 46' bear in abutment against the inner surfaces of the adjacent coupling flanges 16 and 17. This compressional abutment of the outer rubber bushings 44, 44' against the adjacent inner surfaces of their respective coupling flanges 16 and 17 serves to maintain a substantial spacing between the metallic outer surfaces of the intermediate coupling ring 31 and the metallic inner surfaces of the coupling flanges 16 and 17 so that axial deflection can occur between both coupling flanges 16 and 17 and the intermediate coupling ring 31, such spacing function being aided by the projecting annular beads 48, 48'. By having the pockets 36, 36' formed of U-shaped outline, with the outer end of each U facing outwardly of the intermediate coupling ring 31, convenient access is afforded with an open-end wrench to the inner heads 41, 41' of the bolts 40, 40' to hold the bolts against turning in the operation of tightening up the outer clamping nuts 42, 42'.

It will be seen that by virtue of forming the U-shaped pockets or depressions 36, 36' in the opposite faces of the intermediate coupling ring 31, and in alternating sequence, for accommodating the inner ends of the coupling bolts and the inner ends of the inner rubber bushings, the over-all length of the complete flexible coupling 30 is reduced, thereby requiring a lesser amount of separation between the right and left hand elements 14, 15 in the conversion type of coupling. Attention is also directed to the fact that the right hand set of rubber bushings 44, 45 establish one point of flexure in the coupling, and that the left hand set of rubber bushings 44', 45' establish another point of flexure in the coupling; and that both of these points of flexure are in series, are uniformly distributed around the coupling, and are located in approximately the same transverse plane in the coupling.

Summarizing some of the additional advantages of my improved construction, owing to the fact that the rubber bushings 44, 44' and 45, 45' are always maintained under compression, the coupling always tends to align itself, and always tends to resist movement out of alignment. Moreover, the coupling tends to avoid the transmission of shock loads by cushioning the shock in the rubber bushings. Still further, the rubber bushings effectively absorb end thrust in either direction in the line of shafting, and the insulating value of these rubber bushings eliminates conduction losses by electrolysis in marine use and in other situations where electrolysis can occur.

While I have illustrated and described what I regard to be the preferred embodiment of my invention, nevertheless it will be understood that such is merely exemplary and that numerous modifications and rearrangements may be made therein without departing from the essence of the invention. For example, instead of embodying the invention in a conversion type of apparatus for converting a conventional rigid coupling into a flexible coupling, the invention can also be embodied in complete operative form, including the end flanges 16 and 17.

I claim:

1. In a flexible coupling, the combination of two coupling flanges facing each other and having mounting hubs for mounting on two substantially aligned shafts, an intermediate coupling element between said two coupling flanges, the outer faces of said coupling element being spaced from the inner faces of said coupling flanges, U-shaped pockets formed in the opposite faces of said intermediate coupling element and opening outwardly to the outer periphery of said element, and two sets of rubber bushed bolts anchored in said intermediate coupling element and having their inner ends disposed in said U-shaped pockets and each set having their outer ends passing through one of said two coupling flanges.

2. In a flexible coupling, the combination of two coupling flanges facing each other and having mounting hubs for mounting on two substantially aligned shafts, an intermediate metallic coupling element between said two coupling flanges, both of the outer faces of said coupling element being spaced from the inner faces of said coupling flanges, U-shaped pockets formed in the opposite faces of said intermediate coupling element and opening outwardly to the outer periphery of said element, two sets of bolts anchored in said intermediate coupling element with the inner ends thereof disposed in said U-shaped pockets, one set of bolts extending outwardly from one side of said coupling element for attachment to one coupling flange and the other set of bolts extending out from the other side of said coupling element for attachment to the other coupling flange, and rubber bushings mounting the inner ends of said bolts in said intermediate coupling element.

3. In a flexible coupling, the combination of first and second coupling flanges facing each other and having mounting hubs for mounting on two substantially aligned shafts, holes passing through each of said first and second coupling flanges, an intermediate metallic coupling element between said first and second coupling flanges, both of the entire outer faces of said intermediate coupling element being spaced from the opposing inner surfaces of said coupling flanges, a first set of holes in said intermediate coupling element aligned with the holes in said first coupling flange, a second set of holes in said intermediate coupling element aligned with the holes in said second coupling flanges, said first and second sets of holes occurring in alternating sequence around the peripheral portion of said intermediate coupling element, U-shaped pockets formed in one side of said intermediate coupling element in alignment with said first set of holes, U-shaped pockets formed in the other side of said intermediate coupling element in alignment with said second set of holes, said two sets of U-shaped pockets occurring in alternating sequence around said intermediate coupling element, conical depressions formed in the base portions of said U-shaped pockets, a first set of coupling bolts passing through said first set of holes with their inner ends disposed in said first of U-shaped pockets and with their outer ends passing through the holes in said first coupling flange, a second set of coupling bolts passing through said second set of holes with their inner ends disposed in said second set of U-shaped pockets and with their outer ends passing through the holes in said second coupling flange, nuts screwing over the outer ends of said bolts, and rubber bushings engaging around said bolts and seating in said conical depressions.

4. In a flexible coupling, the combination of first and second coupling flanges facing each other and having mounting hubs for mounting on two substantially aligned shafts, holes passing through each of said first and second coupling flanges, an intermediate metallic coupling element between said first and second coupling flanges, both of the entire outer faces of said intermediate coupling element being spaced from the opposing inner faces of said coupling flanges to permit axial deflection between said coupling flanges and said intermediate coupling element, a first set of hole in said intermediate coupling element aligned with the holes in said first coupling flange, a second set of holes in said intermediate coupling element aligned with the holes in said second coupling flange, said first and second sets of holes occurring in alternating sequence around the peripheral portion of said intermediate coupling element, U-shaped pockets formed in one side of said intermediate coupling element in alignment with said first set of holes, U-shaped pockets formed in the other side of said intermediate coupling element in alignment with said second set of holes, said two sets of U-shaped pockets occurring in alternating sequence around said intermediate coupling element, conical depressions formed in each of said holes in said intermediate coupling element leading in a direction away from said U-shaped pockets, oppositely sloping conical depressions in each of said holes leading in a direction toward said U-shaped pockets, a first set of coupling bolts mounted in said first set of holes with their inner ends in said U-shaped pockets and with their outer ends engaging in the holes in said first coupling flange, a second set of coupling bolts in said second set of holes with their inner ends in said U-shaped pockets and with their outer ends passing through the holes in said second coupling flange, and oppositely tapering rubber bushings surrounding each of said bolts in said oppositely tapering conical depressions.

5. In apparatus for convertnig a conventional flange type of rigid shaft coupling having right and left connected coupling flanges into a resilient shaft coupling, the combination of an intermediate coupling element adapted to be interposed between said right and left coupling flanges, one set of U-shaped pockets formed in one side of said intermediate coupling element, another set of U-shaped pockets formed in the other side of said intermediate coupling element, said two sets of U-shaped pockets occurring in alternating sequence around the peripheral portion of said intermediate coupling element, holes passing through said intermediate coupling element in alignment with said U-shaped pockets, conical depressions formed in said holes, a first set of coupling bolts passing from said first set of U-shaped pockets into said right hand coupling flange, a second set of bolts passing from said second set of U-shaped pockets into said left hand coupling flange, and rubber bushings surrounding said bolts and engaging in said conical depressions.

6. In a flexible coupling, the combination of first and second spaced coupling flanges facing each other and adapted for mounting on substantially aligned driving and driven shafts, an intermediate metallic coupling ring mounted between said first and second coupling flanges in axially spaced relation out of physical contact with both coupling flanges, a first set of coupling bolts extending from said intermediate coupling ring outwardly through guide holes in said first coupling flange, a second set of coupling bolts extending from said intermediate coupling ring outwardly through guide holes in said second coupling flange, both sets of coupling bolts having free sliding movement within said guide holes, heads on the inner ends of said coupling bolts, threads on the outer ends of said coupling bolts, clamping nuts screwing over said threads and abutting against the outer sides of said coupling flanges, and rubber bushings mounted on said coupling bolts within said intermediate coupling ring, said rubber bushings being maintained in an axially compressed condition between the heads of said bolts and the inner surfaces of their associated coupling flanges under the clamping action of said clamping nuts, whereby the compressional abutment of said rubber bushings outwardly against said coupling flanges maintains the axially spaced mounting of said intermediate coupling ring out of physical contact with both coupling flanges.

7. In a flexible coupling, the combination of first and second spaced coupling flanges facing each other and adapted for mounting on substantially aligned driving and driven shafts, an intermediate metallic coupling ring mounted between said first and second coupling flanges in axially spaced relation out of physical contact with both coupling flanges, a first set of coupling bolts extending from said intermediate coupling ring outwardly through guide holes in said first coupling flange, a second set of coupling bolts extending from said intermediate coupling ring outwardly through guide holes in said second coupling flange, both sets of coupling bolts having free sliding movement within said guide holes, the coupling bolts of said first and second sets occurring in alternating sequence around said intermediate coupling ring, heads on the inner ends of said coupling bolts, threads on the outer ends of said coupling bolts beyond their respective coupling flanges, clamping nuts screwing over said threads and abutting against the outer sides of said coupling flanges, conical depressions in said intermediate coupling ring through which said coupling bolts pass, and conical rubber bushings mounted on said coupling bolts within said conical depressions, said conical rubber bushings being axially compressed between the heads of said bolts and the inner surfaces of their associated coupling flanges under the clamping action of said clamping nuts, whereby said conical rubber bushings are caused to expand radially outwardly into tight fitting resilient engagement within said conical depressions and whereby the endwise compression of said rubber bushings acting outwardly against the inner faces of said coupling flanges maintains the axially spaced mounting of said intermediate coupling ring out of physical contact with both coupling flanges.

8. In a flexible coupling, the combination of first and second spaced coupling flanges facing each other and adapted for mounting on substantially aligned driving and driven shafts, an intermediate metallic coupling ring mounted between said first and second coupling flanges in axially spaced relation out of physical contact with both coupling flanges, a first set of coupling bolts extending from said intermediate coupling ring outwardly through guide holes in said first coupling flange, a second set of coupling bolts extending from said intermediate coupling ring outwardly through guide holes in said second coupling flange, both sets of coupling bolts being capable of free sliding movement within said guide holes, heads on the inner ends of said coupling bolts, threads on the outer ends of said coupling bolts beyond said coupling flanges, clamping nuts screwing over said threads and abutting against the outer sides of said coupling flanges, external access pockets formed in the opposite sides of said intermediate coupling ring and in which the heads of said coupling bolts are disposed, said pockets affording access to an externally applied wrench for holding said bolt heads against rotation while said clamping nuts are being tightened, conical depressions in said intermediate coupling ring extending from said pockets and through which the shanks of said coupling bolts pass, and conical rubber bushings mounted on said coupling bolts within said conical depressions, said conical rubber bushings being axially compressed between the heads of said bolts and said conical depressions and the inner surfaces of their associated coupling flanges under the clamping action of said clamping nuts, whereby said conical rubber bushings are caused to expand radially outwardly into tight fitting resilient engagement with said conical depressions and whereby the endwise compression of said rubber bushings against said coupling flanges maintains the axially spaced mounting of said intermediate coupling ring out of physical contact with both coupling flanges.

9. In a flexible coupling, the combination of first and second spaced coupling flanges facing each other and adapted for mounting on substantially aligned driving and driven shafts, an intermediate metallic coupling ring mounted between said first and second coupling flanges in axially spaced relation out of physical contact with both coupling flanges, a first set of coupling bolts extending from said intermediate coupling ring outwardly through guide holes in said first coupling flange, a second set of coupling bolts extending from said intermediate coupling ring outwardly through guide holes in said second coupling flange, both sets of coupling bolts being capable of free sliding movement within said guide holes, heads on the inner ends of said coupling bolts, threads on the outer ends of said coupling bolts beyond said coupling flanges, clamping nuts screwing over said threads and abutting against the outer sides of said coupling flanges, external access pockets formed in the opposite sides of said intermediate coupling ring and in which the heads of said coupling bolts are disposed, said pockets affording access to an externally applied wrench for holding said bolt heads against rotation while said clamping nuts are being tightened, axially aligned pairs of reversely tapered conical cavities extending from said pockets and through which the shanks of said coupling bolts pass, said reversely tapering cavities being formed with the larger ends of said cavities facing away from each other, and pairs of reversely tapered conical rubber bushings mounted in said reversely tapered conical cavities, said rubber bushings being axially compressed between the heads of said bolts and the inner surfaces of said conical cavities and of said coupling flanges whereby said conical rubber bushings are caused to expand radially outwardly into tight fitting resilient engagement with said conical depressions and whereby the endwise compression of said rubber bushings outwardly against the inner faces of said coupling flanges maintains the axially spaced mounting of said intermediate coupling ring out of physical contact with both coupling flanges.

References Cited in the file of this patent

UNITED STATES PATENTS

| | | |
|---|---|---|
| 1,322,087 | Bogert | Nov. 18, 1919 |
| 1,626,195 | Hiller | Apr. 26, 1927 |
| 1,626,351 | Nowosielski | Apr. 26, 1927 |
| 1,770,550 | Powers | July 15, 1930 |
| 2,449,654 | Jessop | Sept. 21, 1948 |
| 2,477,447 | Fawick | July 26, 1949 |
| 2,753,702 | Dunn | July 10, 1956 |

FOREIGN PATENTS

| | | |
|---|---|---|
| 484,834 | Great Britain | May 11, 1938 |